(12) United States Patent
Hoffman et al.

(10) Patent No.: US 12,423,648 B2
(45) Date of Patent: Sep. 23, 2025

(54) SYSTEM AND METHOD FOR STOCK INVENTORY MANAGEMENT

(71) Applicant: Safran Cabin Netherlands N.V., Alkmaar (NL)

(72) Inventors: Arne Hoffman, Amsterdam (NL); Ron Verweij, Amersfoort (NL); Anil Ravi, Huntington Beach, CA (US)

(73) Assignee: Safran Cabin Netherlands N.V., Alkmaar (NL)

( * ) Notice: Subject to any disclaimer, the term of this patent is extended or adjusted under 35 U.S.C. 154(b) by 160 days.

(21) Appl. No.: 17/765,806

(22) PCT Filed: Oct. 2, 2020

(86) PCT No.: PCT/IB2020/059294
§ 371 (c)(1),
(2) Date: Mar. 31, 2022

(87) PCT Pub. No.: WO2021/064693
PCT Pub. Date: Apr. 8, 2021

(65) Prior Publication Data
US 2022/0327471 A1    Oct. 13, 2022

Related U.S. Application Data

(60) Provisional application No. 62/910,292, filed on Oct. 3, 2019.

(51) Int. Cl.
*G06Q 10/087*      (2023.01)
*G06V 10/20*       (2022.01)
(Continued)

(52) U.S. Cl.
CPC .......... *G06Q 10/087* (2013.01); *G06V 10/25* (2022.01); *G06V 10/255* (2022.01);
(Continued)

(58) Field of Classification Search
CPC .... G06Q 10/087; G06V 10/25; G06V 10/255; G06V 10/764; G06V 10/82; G06V 20/35;
(Continued)

(56) References Cited

U.S. PATENT DOCUMENTS 9,280,560 B1    3/2016  Dube
11,393,253 B1 *  7/2022  Maron ................... G06V 10/25
(Continued)

FOREIGN PATENT DOCUMENTS

KR    10-2471775 B1 * 11/2022
WO    2017152990 A1    9/2017

OTHER PUBLICATIONS

Kaiming He et al: Mask R-CNN, 2017 IEEE International Conference On Computer Vision (ICCV), Oct. 1, 2017 (Oct. 1, 2017) pp. 2980-2988, XP055745836, DOI: 10.1109/ICCV.2017.322 ISBN: 978-1-5386-1032-9; p. 1; figures 1,5,6.
(Continued)

*Primary Examiner* — A. Hunter Wilder
(74) *Attorney, Agent, or Firm* — Kilpatrick Townsend & Stockton LLP (57) ABSTRACT

A method of inventory management involves steps to obtain a real-time image of a scene using a sensor, filter the real-time image to delineate portions of the scene, predict objects in the filtered real-time image, identify portions of the objects, and classify the objects using a trained model and the identified portions. The method transmits the real-time image to a remote site configured to generate updates to the trained model. The trained model is sent via over-the-air updates to the trained model. A method of image detection and training involves steps to receive image information of a scene, filter the image information to specify delineated portions of the scene, label portions of the image information, train a convolutional neural network to identify
(Continued)

features of the labeled portions, extract the features of the labeled portions, and train a model based on the extracted features to be used in connection with real-time object detection.

15 Claims, 10 Drawing Sheets

(51) Int. Cl.
| | |
|---|---|
| *G06V 10/25* | (2022.01) |
| *G06V 10/764* | (2022.01) |
| *G06V 10/82* | (2022.01) |
| *G06V 20/00* | (2022.01) |
| *G06V 20/59* | (2022.01) |
| *G06V 20/70* | (2022.01) |

(52) U.S. Cl.
CPC ............ *G06V 10/764* (2022.01); *G06V 10/82* (2022.01); *G06V 20/35* (2022.01); *G06V 20/59* (2022.01); *G06V 20/70* (2022.01); *G06V 2201/07* (2022.01); *G06V 2201/08* (2022.01)

(58) Field of Classification Search
CPC .... G06V 20/59; G06V 20/70; G06V 2201/07; G06V 2201/08; G06F 18/24; G06N 3/045; G06N 3/08
See application file for complete search history.

(56) References Cited

U.S. PATENT DOCUMENTS

| | | | |
|---|---|---|---|
| 2016/0357370 A1* | 12/2016 | Willey | ................ G06F 3/04842 |
| 2019/0080171 A1 | 3/2019 | Zheng | |
| 2019/0080277 A1 | 3/2019 | Trivelpiece | |
| 2019/0166823 A1* | 6/2019 | Dick | ................. G06F 18/24133 |
| 2019/0311318 A1* | 10/2019 | Bauer | .................. B65G 1/0492 |
| 2020/0098116 A1* | 3/2020 | Rozner | .................. G06V 20/10 |
| 2020/0193112 A1* | 6/2020 | Pang | ..................... G06K 7/1439 |
| 2021/0024215 A1* | 1/2021 | Browne | ............... G06Q 10/087 |

OTHER PUBLICATIONS

Anonymous: "The Complete List of Airlines That Offer WiFi Onboard—eDreams", Jan. 12, 2018 (Jan. 12, 2018) XP055746967, Retrieved from the Internet: URL:https://www.edreams.com/blog/in-flight-wifi/ [retrieved on Nov. 4, 2020] p. 1.
International Search Report and Written Opinion issued in PCT/IB2020/059294.

* cited by examiner

SYSTEM AND METHOD FOR STOCK INVENTORY MANAGEMENT

CROSS REFERENCE TO RELATED APPLICATIONS

This application is a national stage application, filed under 35 U.S.C. § 371, of International Patent Application No. PCT/IB2020/059294, filed on Oct. 2, 2020, which claims the benefit of U.S. Provisional Application No. 62/910,292, filed Oct. 3, 2019, the entirety of which is incorporated herein by reference.

FIELD OF THE INVENTION

The present invention relates generally to a system and method for stock inventory management, and more particularly to inventorying aircraft catering items, consumption and stock.

BACKGROUND OF THE INVENTION

Airlines are in need of a system and method to manage their resources more efficiently by obtaining real-time accurate information about consumption and stock of airline trolley, standard containers, ovens and other stowages in the galley. This need ranges from, but is not limited to, trolleys, spoons, toothpicks, wine and other high value items. Manual inflight stock management has proven to be cumbersome and inaccurate. There is therefore a need to monitor inflight catering stock and reporting it to relevant personnel in an efficient and accurate manner. Accurate information could improve off and onboard processes as well as overall customer experience. A method to manage airline resources more efficiently would help to reduce waste and cost through optimized catering loading plans. Up-to-date catering stock information could assist flight attendants in their daily job, by guided order handling, among other things. There is also a need for an accurate, up-to-date catering stock information that could serve as a data source for new concepts like self-service shopping galleys, among other things.

SUMMARY OF THE PREFERRED EMBODIMENTS

In accordance with a first aspect of the present invention there is provided a method of inventory management that includes steps to obtain a real-time image of a scene using a sensor, filter the real-time image to delineate portions of the scene, predict objects in the filtered real-time image, identify portions of the objects, and classify the objects using a trained model and the identified portions. The method may transmit the real-time image to a remote site configured to generate updates to the trained model. The trained model may be received via over-the-air updates to the trained model. The method may predict objects by utilizing masking techniques. The portions of images may be a pixel.

The method may classify an object as a transport vehicle. The method may classify an object as being inserted at a location or removed from the location.

An exemplary method of image detection and training involves steps to receive image information of a scene, filter the image information to specify delineated portions of the scene, label portions of the image information, train a convolutional neural network to identify features of the labeled portions, extract the features of the labeled portions, and train a model based on the extracted features to be used in connection with real-time object detection. The method may label or predict objects by utilizing masking techniques. The method may receive real-time images of a scene. The convolutional neural network may be a region-based convolutional neural network.

An exemplary stock management system includes a sensor configured to receive a real-time image of a scene, a wireless communication device configured to transmit and receive wireless data, a vision recognition system configured to utilize the sensor to obtain a real-time image of the scene, filter the real-time image to delineate portions of the scene, predict at least one object in the filtered real-time image, identify at least one portion of the at least one object, and classify the at least one object using a trained model in connection with the at least one identified portion, and a remote machine learning system configured to generate updates to the trained model using the wireless communication device.

The stock management system may include that the remote machine learning system is configured to receive image information of a scene, filter the image information to specify delineated portions of the scene, label at least one portion of the image information, train a convolutional neural network to identify features of the at least one portion of the image information, extract the features of the at least one portion of the image information, and train a model based on the extracted features to be used in connection with real-time object detection.

A security system module may be utilized to provide security for at least one of the wireless data, the real-time image, the at least one object, the at least one portion of the at least one object, and the trained model. The security system module may be a hardware security module or a software security module.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, the drawings show a system and method for stock inventory management.

The present invention is a method for inventorying aircraft catering items and a system for headless onboard stock management by using vision recognition and machine learning. This specification includes the description of technology, embedded hardware device(s), firmware and associated algorithms and related applications. For the purposes of this application headless retail and headless stock management refers to a system where front-end and back-end are not integrated but where the communication is done through Application Protocol Interfaces (APIs). In such headless retail and headless stock management cases an item level vision module and vision software detect an item on a tray and recognize it, translate it into a code and send this to a stock server in the Galley, in turn running on a Galley Information System.

The system and method can be used for a wide range of applications, from stock management to headless retail applications. The system uses, but is not necessarily limited to, embedded vision and deep learning algorithms. Embedded vision refers to incorporating practical computer vision capabilities in to embedded systems such as mobile devices and custom controllers which typically operate with constrained resources (memory, computing power etc.). Deep learning is a subset of machine learning in artificial intelligence (AI) that has networks capable of learning unsupervised from data that is unstructured or unlabeled.

The system and method includes tracking catering items inflight, in galley and during service rounds, and on the ground. The system and method identifies the type and amount of items within an aircraft service trolley. The system and method are not limited to tracking items only; rather, they can detect other events like, for example, inappropriate use, theft of items, status indication, or the like.

Figure 1:
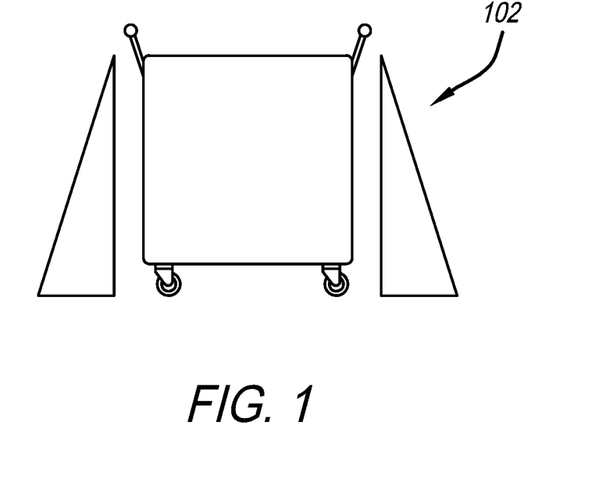
FIG. 1 is a top view of a trolley in accordance with an exemplary system and method.
Figure 2:
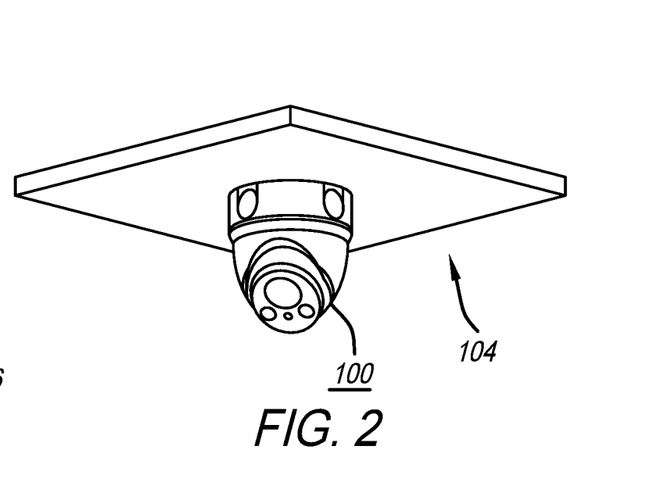
FIG. 2 is a perspective view of an exemplary ceiling-mounted system and method.
Figure 3:
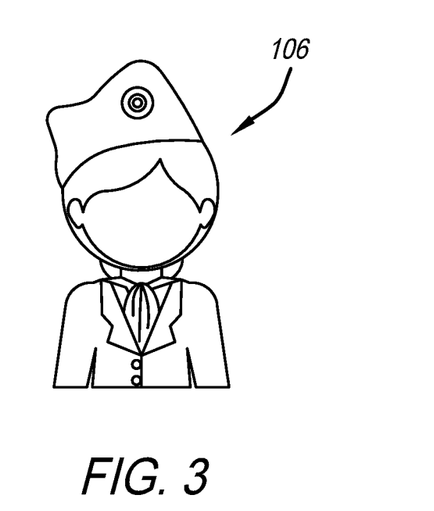
FIG. 3 depicts a flight attendant utilizing a device in accordance with an embodiment of the present invention.

The system and method includes an embedded device for tracking insertion and removal of catering items from an airline trolley, standard containers, ovens and other stowages in the galley. The working principle of the system and method is as follows. The system and method includes an embedded device with camera and onboard vision recognition capabilities. In a preferred embodiment, camera(s) are pointed in the direction of the working area (e.g. aircraft galley) and/or trolley door. The camera(s) should have a clear view on the working area in order to detect removal and insertion of items. Possible mounting positions are on the trolley, for example, integrated into the handle, or on working area ceiling. It is possible to use a wearable and/or personal device. FIG. 1 is a top view of a trolley in which an exemplary system and method may be implemented; FIG. 2 is a perspective view of an exemplary ceiling-mounted system and method; and FIG. 3 depicts a flight attendant utilizing a wearable and/or personal device in accordance with an embodiment of the present invention.

A Central Processing Unit (CPU) and/or Graphics Processing Unit (GPU) and/or Field Programmable Gate Array (FPGA) continually processes the camera signal with trained deep learning models to recognize events (for example removal of an item). Each detected event will trigger an event message to the observers (for example using Message Queuing Telemetry Transport (MQTT) or a similar method via the Bluetooth Low Energy (BLE) and/or WIFI and/or wired connection to dispatch the events. While certain wireless connection systems have been described, one of ordinary skill in the art would recognize that the system and method are not so limited, but could include other unmentioned communication protocols and devices. Detected events with a low certainty may be uploaded to the off flight deep learning training system. These events will be used to train the system and update the trained models via Over the Air (OTA) updates using the airplane ground connection.

In a preferred embodiment, the system components include an embedded device 100 on trolley 102 and/or multiple embedded devices 100 mounted on the ceiling 104 of the working area, for example the aircraft galley, an offsite machine learning training system, existing airplane to ground connections (satellite, mobile networks etc.), data application programming interface (API) for communication with external systems. The system includes a wireless communication device or module (BLE and/or WIFI) plus optional powered hardware, Complementary Metal Oxide Semiconductor (CMOS) and/or Charge Coupled Device (CCD) Sensor (e.g. Camera), CPU/GPU/FPGA plus memory, real time clock, battery and/or optional cable powered capabilities. The system also includes software components, embedded software with security, messaging protocol like MQTT and/or Constrained Application Protocol (CoAP), trained deep learning models with inference algorithms for item recognition, an over-the-air (OTA) update system for updating the deep learning models, and off-flight deep learning model training software.

In a preferred embodiment, images captured with the camera will be analyzed by an image detection algorithm that will make use of deep learning and AI. The system is split into two parts; the training of the algorithm will take place off-board (i.e., at a remote site) with a computer cluster. The trained model or algorithm will be uploaded to a trolley embedded device via a ground-to-airplane connection. This makes it possible to update the detection algorithm any time. Alternative arrangements of the system components and updating capabilities are within the scope of this invention.

Figure 4:
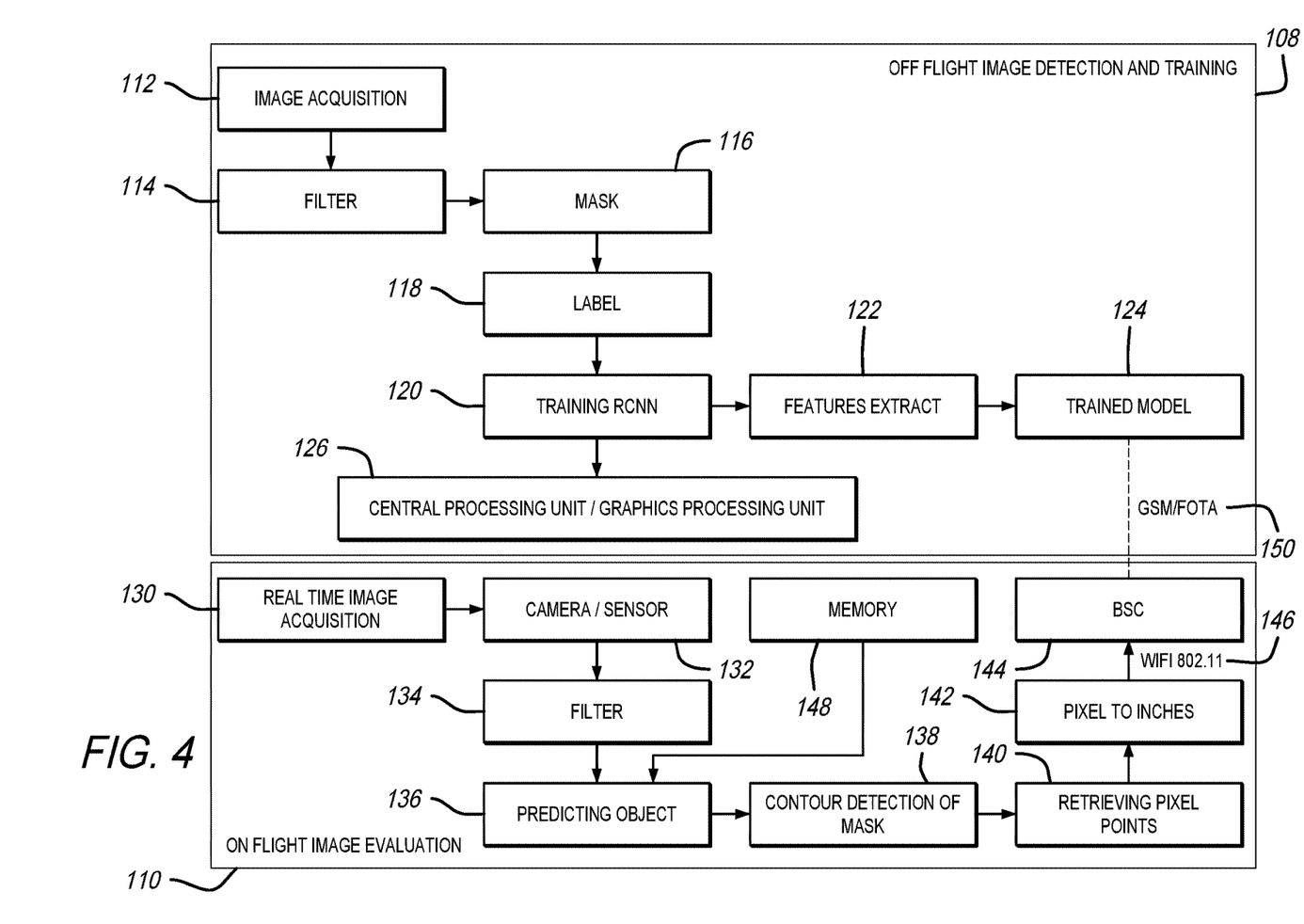
FIG. 4 is a block diagram depicting an exemplary system and method of the present invention.

FIG. 4 is a block diagram depicting an exemplary system and method of the present invention. FIG. 4 shows the split system and method including the Off-Flight Image Detection and Training 108 and On-Flight Image Evaluation 110. The Off-Flight Image Detection and Training 108 includes image acquisition module 112, filter module 114, mask module 116, label module 118, training RCNN module 120, features extract module 122, and trained model module 124. The Off-Flight Image Detection and Training 108 also includes CPU/GPU 126.

The image acquisition module 114 receives an image of a scene. The image may be a stock image of a trolley 102, a tray 128, or other location or area in which objects in the scene—or objects missing from the scene—are required to be identified or detected. The image may also be from a real-time image capture rather than a stock image.

The filter module 114 is used in connection with the system and method to delineate or enhance portions of the image or scene. For example, the filter module 114 is used to filter the image to brighten, darken, change the pixel range of the image, change colors, etc., to modify or enhance image properties and/or to extract information from the images. Use of filtering may identify edges, corners, objects, and other features of an image. One of ordinary skill in the art would understand that the filters may vary depending on the type of image and application used.

The mask module 116 is used to detect features of an image. Dissimilarly to a filter, however, the mask module 116 typically provides a pixel-by-pixel representation (e.g., in matrix format) and provides mask information that may be utilized to identify shapes, sizes, and other features of an object within the image. For example, the mask module 116 is used in combination with the training RCNN module 120 in a Mask Region-based Convolutional Neural Network (Mask R-CNN or M-RCNN) to provide object recognition tasks. The Mask R-CNN model allows a computer vision system to identify the presence, location, and type of objects within an image. R-CNN, upon which Mask R-CNN is based, will be discussed in more detail in connection with the training RCNN module 120.

The label module 118 is used to label portions of the image. For example, the label module 118 may utilize a database of known objects and their respective size, shape, and other features. These functions are provided in connection with the masking function of the mask module 116 and utilized as part of the Mask R-CNN model of object detection.

The training RCNN module 120 implements Region-based Convolutional Neural Network, a family of convolutional neural networks designed for object detection. R-CNN generally obtains an image as an input and places bounding boxes around and labels for each object in the image. One of ordinary skill in the art would understand that convolutional neural networks other than Mask R-CNN or other variants of R-CNN could be utilized within the scope of this invention. The training RCNN module 120 includes the use of multiple images to enhance the trained model utilized by the On-Flight Image Evaluation 110. As an embodiment, when the On-Flight Image Evaluation 110 detects events with a low certainty, the communications module 144 may receive the image in question to enhance the deep learning training of the R-CNN model. The training RCNN module 120 ultimately achieves improved deep learning training by utilizing low-certainty events and corresponding images.

The features extract module 122 obtains the results of the training RCNN module 120 and extracts features of the objects in question.

The trained model module 124 receives the extracted features from the features extract module 122 and updates or generates a new trained model to be utilized by the On-Flight Image Evaluation 110.

The CPU/GPU 126 is utilized to process, both data and graphically, the objects and object label information to train the R-CNN to better extract features of the objects to be used in the trained model. One of ordinary skill in the art would understand that the CPU/GPU 126 in connection with the training RCNN module 120 is well known, and that other configurations of training deep machine learning are available.

The On-Flight Image Evaluation 110 includes real-time image acquisition 130, a camera/sensor 132, a filter module 134, an object prediction module 136, a mask detection module 138, a pixel point retrieval module 140, a size conversion module 142 (e.g., Pixel to Inches depicted in FIG. 4), a communications module 144, a communications channel 146, and a memory module 148. The Off-Flight Image Detection and Training 108 and the On-Flight Image Evaluation 110 are configured to be connected by a Global System for Mobile Communications (GSM) communications channel 150 for Firmware Over-The-Air (FOTA) capabilities.

The real-time image acquisition 130 is an input to the camera/sensor module 132. The camera/sensor module 132, for example, is a CMOS and/or CCD sensor. One of ordinary skill in the art would recognize that other cameras or sensors could be utilized without departing from the present invention.

The filter module 134 is used to delineate or enhance portions of the image or scene, similarly to the filter module 114. One of ordinary skill in the art would understand that various filters may be utilized without departing from the present invention.

The object prediction module 136 is utilized in the On-Flight Image Evaluation 110 to predict the location, size, shape, and type of object in the real-time image. This may be utilized in connection with the Mask R-CNN model or other convolutional neural network models designed for object detection, and is typically an initial step in confirming the object's location and type before making an ultimate conclusion about the object. The memory module 148 is configured to assist the object prediction module 136.

The mask detection module 138 utilizes masks to identify contours of the object. For example, a contour on an object may be detected utilizing luminance changes, texture changes, perceptual grouping, illusory contours, or the like. A contour may include an edge, a boundary, curves, and discontinuities in photometrical, geometrical, or physical characteristics of objects. The mask detection module 138 utilizes, in a preferred embodiment, a pixel-based approach, which constructs various features of an object to determine whether each pixel of the object belongs to a contour. Gray-scale intensity and gradient magnitude are known methodologies to identify discontinuities—i.e., discontinuity features. Contour detection may also utilize distinctions in brightness, color, texture, and noise, to specify contour features. Mask utilization may segment out particular portions of an image or object to facilitate contour detection.

The pixel point retrieval module 140 is configured to convert the mask detection of contours of the mask detection module 138 into pixel points. As specified above in connection with the description of Mask R-CNN, pixel-by-pixel analysis may be implemented in a matrix format to assist in object detection. The size conversion module 142 converts distances in pixels to distances in inches, for example, to assist in object recognition. An output of the method and system provides a conclusion about one or more objects in a real-time image of a scene.

The communications module 144 is coupled to other modules within the On-Flight Image Evaluation 110 by the communications channel 146. For example, the communications channel 146 utilizes WIFI 802.11 as a communication interface protocol.

The Off-Flight Image Detection and Training 108 and On-Flight Image Evaluation 110 communicate, in an embodiment, through the GSM communications module 150. The GSM communications module 150 is configured to provide, at least, updates to the trained model from the trained model module 124 that is utilized by the On-Flight Image Evaluation 110, and images or image date from the On-Flight Image Evaluation 110 to the Off-Flight Image Detection and Training 108 to be utilized by the training RCNN module 120 for deep machine learning.

Figure 5:
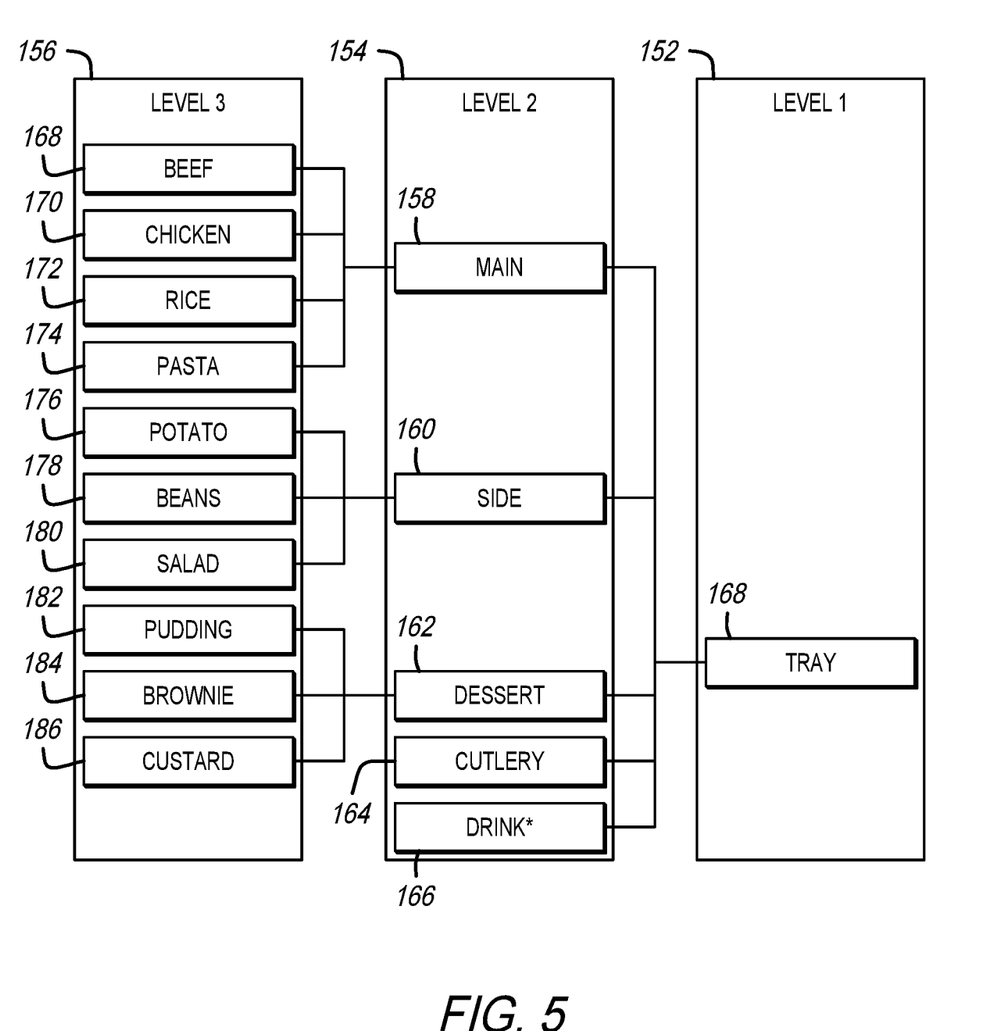
FIG. 5 is a depiction of an exemplary classification of catering food items in connection with a food tray.

FIG. 5 is a depiction of an exemplary classification of catering food items and an example of a food tray 128. FIG. 5 is broken down into three levels 152, 154, 156. At Level 1 152, a tray 128 is detected. At Level 2 154, the tray 128 is isolated as an object and sub-objects are detected, such as a main 158, a side 160, a dessert 162, cutlery 164, and a drink 166. At Level 2 156, the main 158 is isolated as a sub-object and sub-sub-objects are detected, such as a beef main 168, a chicken main 170, a rice main 172, or a pasta main 174. The side 160 is also isolated and sub-sub-objects are identified such as a potato side 176, a beans side 178, or a salad side 180. The dessert 162 is isolated and sub-sub-objects are detected such as a pudding dessert 182, a brownie dessert 184, or a custard dessert 186.

Figure 6:
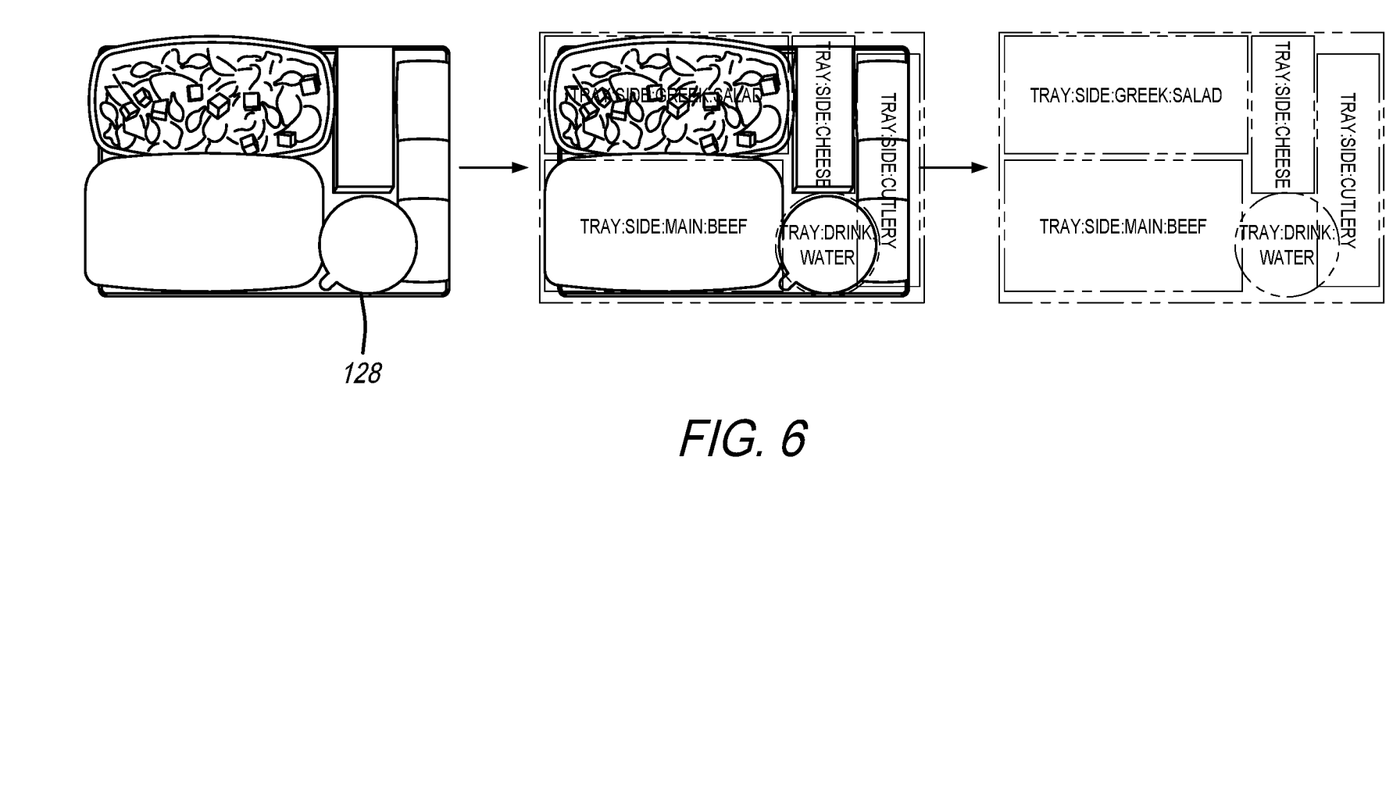
FIG. 6 graphically depicts object detection and classification in accordance with an embodiment of the present invention.

FIG. 6 further identifies an exemplary classification system and method in accordance with the present invention. FIG. 6 graphically depicts object detection and classification in accordance with an embodiment of the present invention. The left-most drawing of FIG. 6 shows an image of the tray 128 including several objects therein. The middle drawing of FIG. 6 shows how the system and method isolates and defines boundaries for each of the objects. The various objects are detected: TRAY:SIDE:MAIN:BEEF; TRAY:SIDE:GREEK SALAD; TRAY:SIDE:CHEESE; TRAY:DRINK:WATER; and TRAY:SIDE:CUTLERY. In the right-most drawing of FIG. 6, the objects are further broken down by labels only; thus, the actual image and objects therein are removed and the labels remain.

Figure 7:
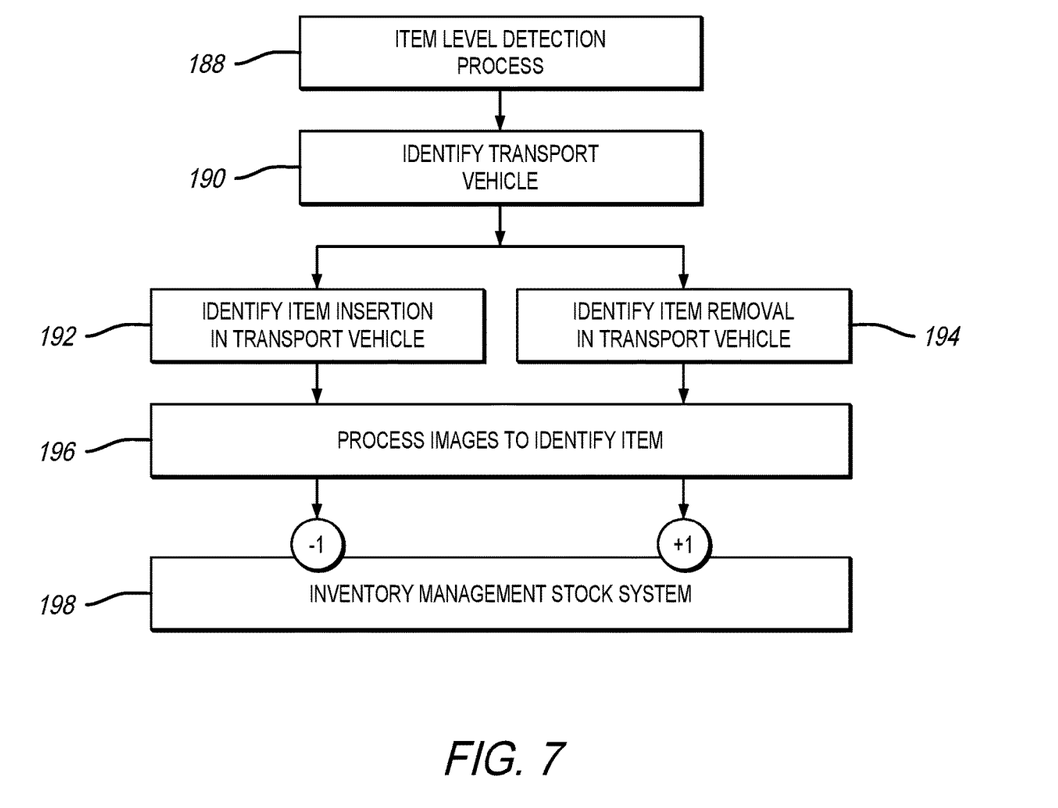
FIG. 7 is a flow diagram depicting a method of stock inventory management in accordance with an embodiment of the present invention.

FIG. 7 is a flow diagram depicting a method of stock inventory management in accordance with the present invention.

At Step 188, the method detects objects in accordance with the item level detection process depicted in FIG. 5. A vision camera 132 is positioned in the galley 202, on the trolley 102, or on a flight attendant 106 facing towards a working area.

At Step 190, the method detects the identity of a transport vehicle 204. For example, vision camera 132 may continually monitor a scene and trigger the method to be implemented when a transport vehicle 204 is detected. The method must also identify which transport vehicle 204 the item is inserted or removed from. The transport vehicle is identified, and with this identifier the stock system can, later in the process, define which stock lists to update.

At Step 192, the method identifies whether an item has been inserted into the transport vehicle 204. At Step 194, the method identifies whether an item has been removed from the transport vehicle 204. The vision camera 132 is configured to detect movement in the scene on which it is focused, thereby alerting the system that object detection is required.

At Step 196, the method processes the images to identify an item that has been inserted or removed from the transport vehicle 204. Thus, when the insertion or removal of an item is detected, the images are processed to identify the item. The system and method described herein includes a real-time image detection or evaluation system and method.

At Step 198, the method sends insertion/removal information to the inventory management stock system 200 that updates its database to account for the increase or decrease of stock items. The transport vehicle(s) 204 (serial numbers 1 . . . n) are located and detected to be on a certain location, for example, the galley position, in the galley(s) 202 (serial numbers 1 . . . n). After insertion or deduction of the item in the transport vehicle, the transport vehicle 204 stock, galley 202 stock and the aircraft stock 200 will be updated. Based on the stock change, a user interface may inform the transport vehicle 204 loader/unloader or flight attendant through a context-aware interface about the actual stock situation.

An item may have various stock statuses depending on the location of the transport vehicle(s) 204 (serial numbers 1 . . . n). An item in the transport vehicle 204 during transport from the catering facility onto the actual storing in the galley is in transport until the actual handover between caterer and airline. When handed over, the item is part of the galley 202 (serial numbers 1 . . . n) stock. When the item is in the transport vehicle 204 but the transport vehicle 204 is removed from the galley 202 (serial numbers 1 . . . n), but still in the galley 202 for service preparation, the item becomes service stock but still is part of the transport vehicle(s) 204 (serial numbers 1 . . . n), a transport vehicle 204 that also changed status to service vehicle, but still in the galley 202 mode.

Figure 8:
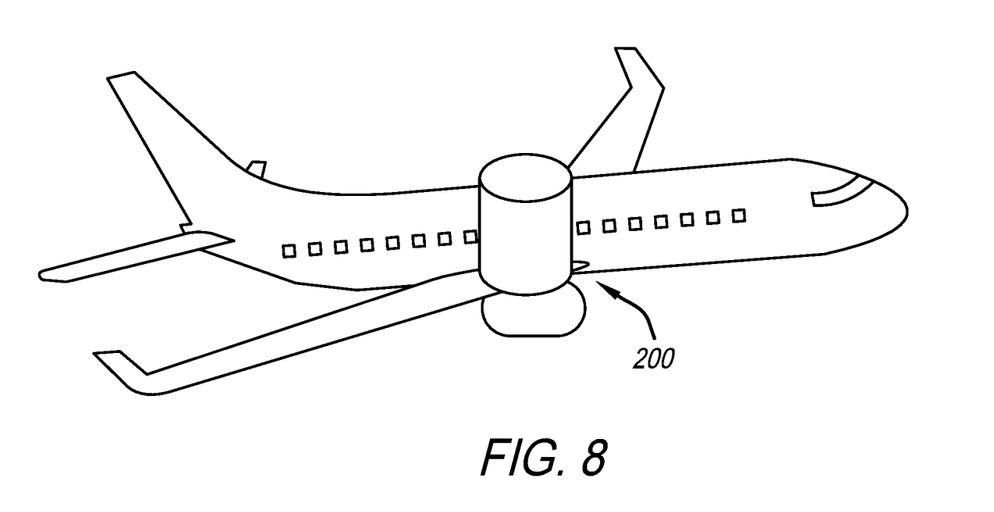
FIG. 8 is a graphical representation of an airplane with an inventory management stock system in accordance with an embodiment of the present invention.
Figure 9:
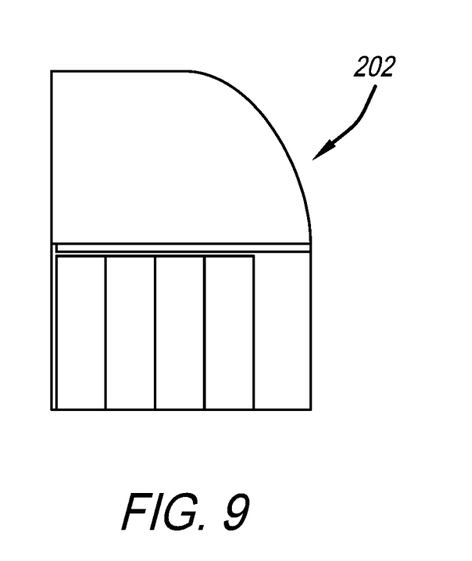
FIG. 9 is a side view of a galley in accordance with an embodiment of the present invention.

FIG. 8 is a graphical representation of an airplane with an inventory management stock system 200. FIG. 9 is a galley 202 including several galley positions in which a trolley 102 may be inserted. While the inventory management stock system 200 is shown as being implemented on an airplane, it may be implemented partially on an airplane and, through communications channels, partially at a remote site. Further, the inventory management stock system 200 may be implemented within a warehouse, brick-and-mortar facility, or other suitable locations, or for headless retail applications. This method can enable, when combined with a stock system 200 and a payment application, self-service capabilities and allow a trolley 102 or galley 202 to be used as a self-service onboard store for food, beverage and other items.

Figure 10:
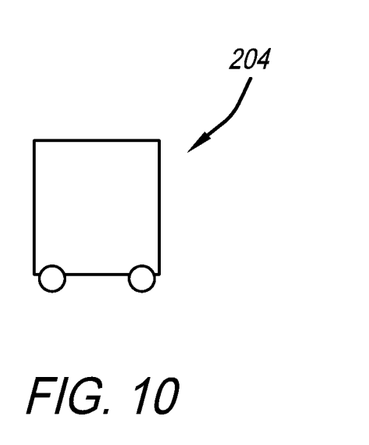
FIG. 10 is a side view of a transport vehicle in accordance with an embodiment of the present invention.

FIG. 10 is a side view of a transport vehicle in accordance with an embodiment of the present invention.

Figure 11:
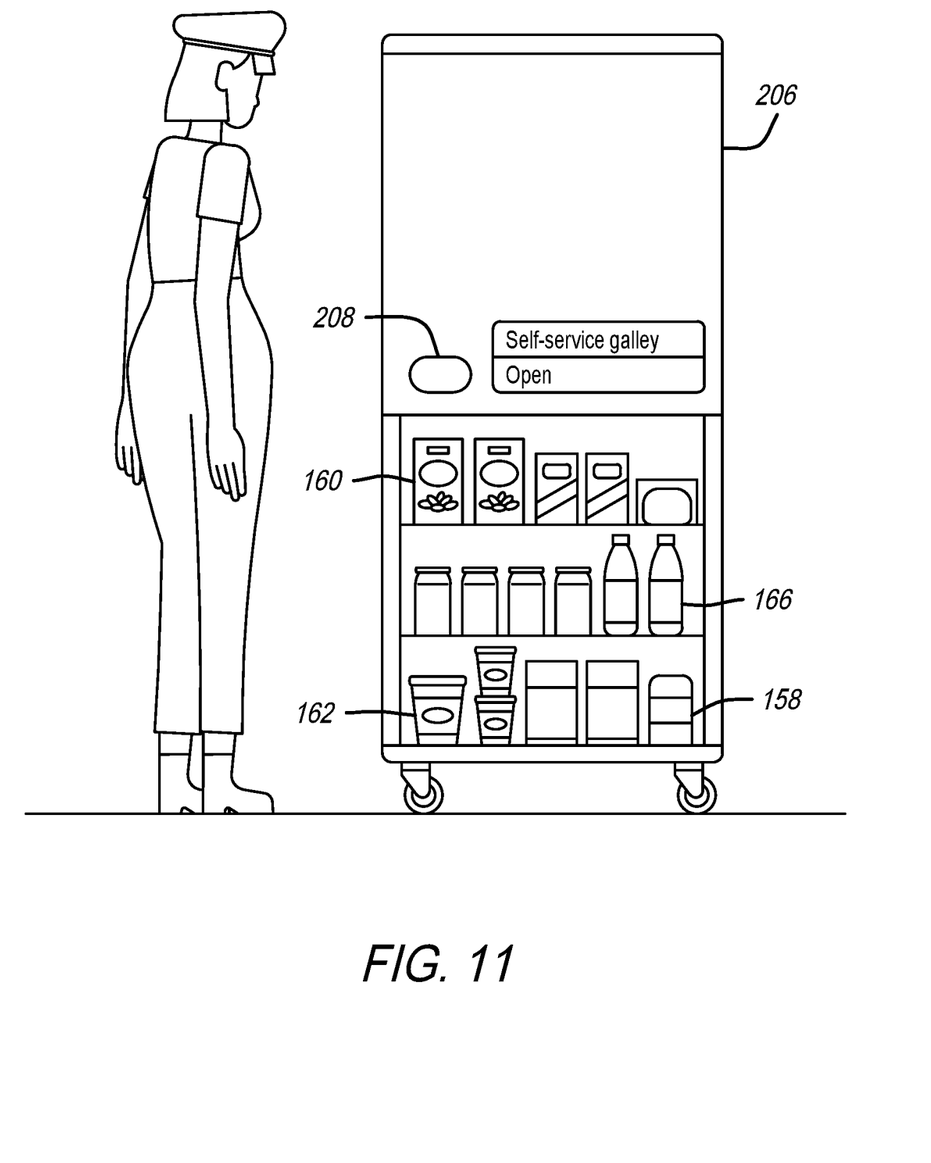
FIG. 11 is a graphical representation of a flight attendant and a self-service galley in accordance with an embodiment of the present invention.

FIG. 11 is a graphical representation of a flight attendant and a self-service galley 206. The self-service galley 206 may include mains 158, sides 160, desserts 162, or drinks 166, among other things. The self-service galley 206 may include a handle 208 to remove or insert items.

Figure 12:
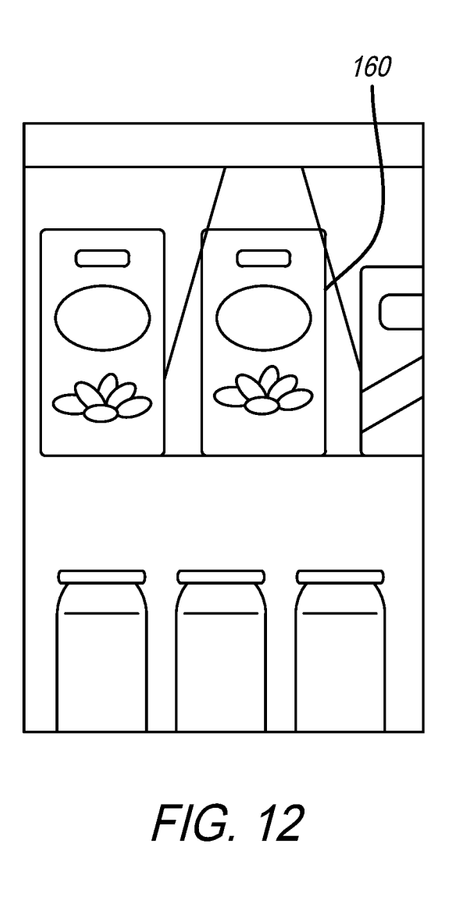
FIG. 12 is a graphical depiction of an item in the self-service galley of FIG. 11 in accordance with an embodiment of the present invention.

FIG. 12 is a graphical depiction of an item being illuminated by internal light of the self-service galley 206 of FIG. 11. In this depiction, a user has chosen to purchase the side 160 and the self-service galley 206 has illuminated the user's selection.

Figure 13:
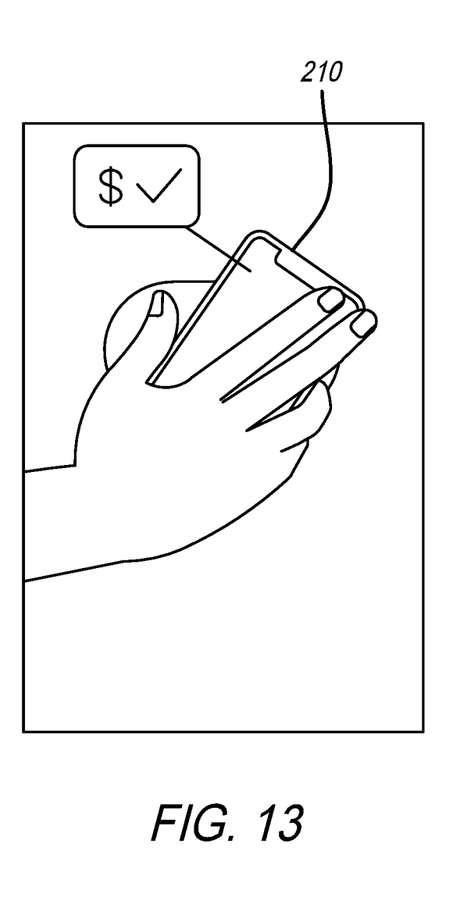
FIG. 13 is a graphical depiction of a user purchase of an item in the self-service galley of FIG. 11 in accordance with an embodiment of the present invention.

FIG. 13 is a graphical depiction of a user using a smartphone 210 to purchase the selected item. Once the user has paid for the item, the user may open the self-service galley 206 and remove the item.

Figure 14:
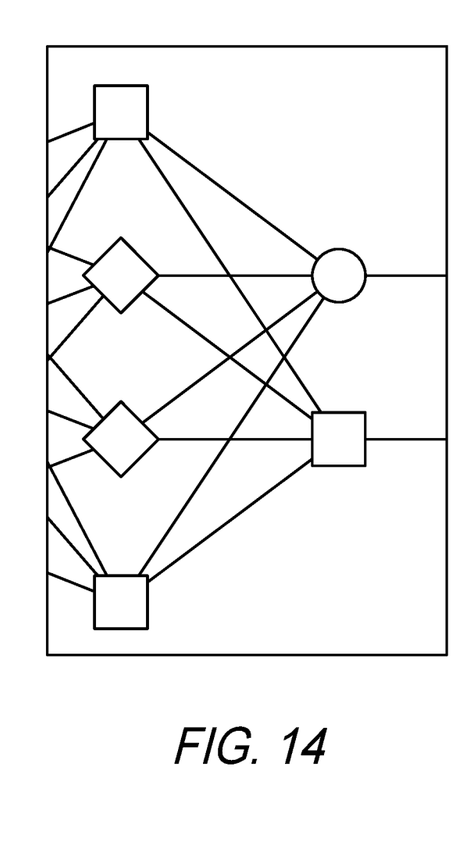
FIG. 14 is a graphical depiction of the inventory management stock system in accordance with an embodiment of the present invention.

FIG. 14 is a graphical depiction of the inventory management stock system 200 updating, through various communications channels, respective databases, as described above in connection with FIG. 7.

Figure 15:
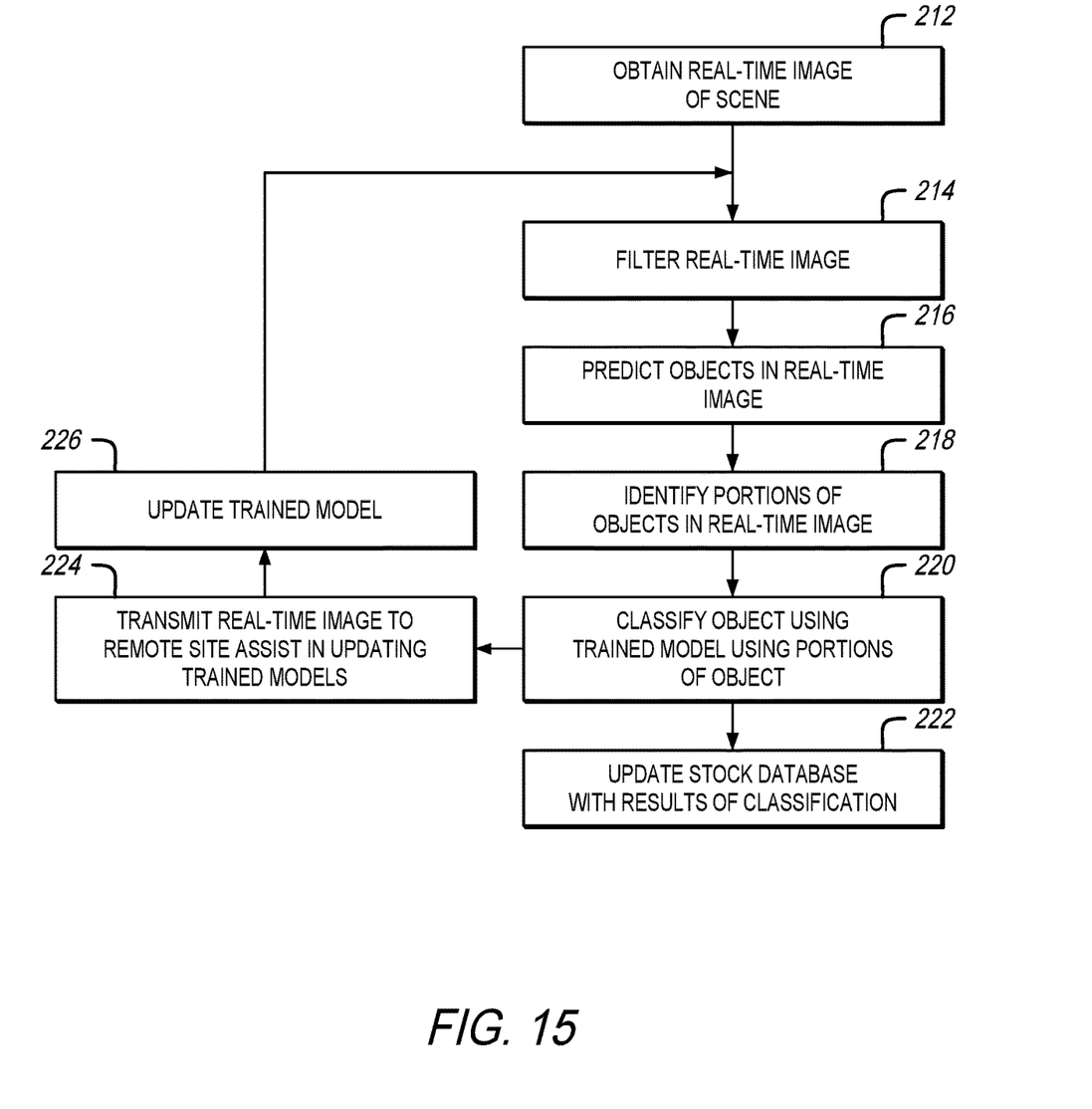
FIG. 15 is a flow diagram of a method of inventory management in accordance with an embodiment of the present invention.

FIG. 15 is a flow diagram of a method of inventory management in accordance with an embodiment of the present invention. At Step 212, the method obtains a real-time image of a scene. The method in an exemplary embodiment uses the camera/sensor 132 to do so.

At Step 214, the method filters the real-time image to delineate portions of the scene. As described above, filtering may be utilized to brighten, darken, change the pixel range of the image, change colors, etc., to modify or enhance image properties and/or to extract information from the images. Use of filtering may identify edges, corners, objects, and other features of an image. One of ordinary skill in the art would understand that the filters may vary depending on the type of image and application used.

At Step 216, the method predicts objects in the real-time image that has been filtered. The object prediction may occur in connection with Mask R-CNN, as described above, or through another convolutional neural network. Other methodologies of object prediction are within the scope of the present invention. The prediction may indicate the general location, size, shape, and other characteristics of the object.

At Step 218, the method identifies portions of the predicted objects in the real-time image. Again, the identification of portions may occur in connection with Mask R-CNN, as described above, or through another convolutional neural network. As above, other methodologies of object prediction are within the scope of the present invention. For example, the portions of the object may be pixels.

At Step 220, the method classifies objects using a trained model based on the identified portions. Again, the classification of objects may occur in connection with Mask R-CNN, as described above, or through another convolutional neural network. As above, other methodologies of object prediction are within the scope of the present invention. The trained model may utilize matrices of pixels along with pixels representing the identified portions to determine the identity—classification—of the object.

At Step 222, the method updates the stock database with the results of the classification.

At Step 224, the method transmits the real-time image to a remote site to assist in updating the trained model. The trained model, as described herein, may be updated by low-certainty object recognition classification results to generate better results for real-time use.

At Step 226, the method updates the trained module. The updated trained model is sent to the location where the real-time images are being obtained to update the trained model for use in real-time image detection and analysis. As described herein, the updates may be received as over-the-air firmware updates. One of ordinary skill in the art would recognize that the specificities of the particular application may allow for use of cloud-based computing and remote-site deep machine learning of trained models.

Figure 16:
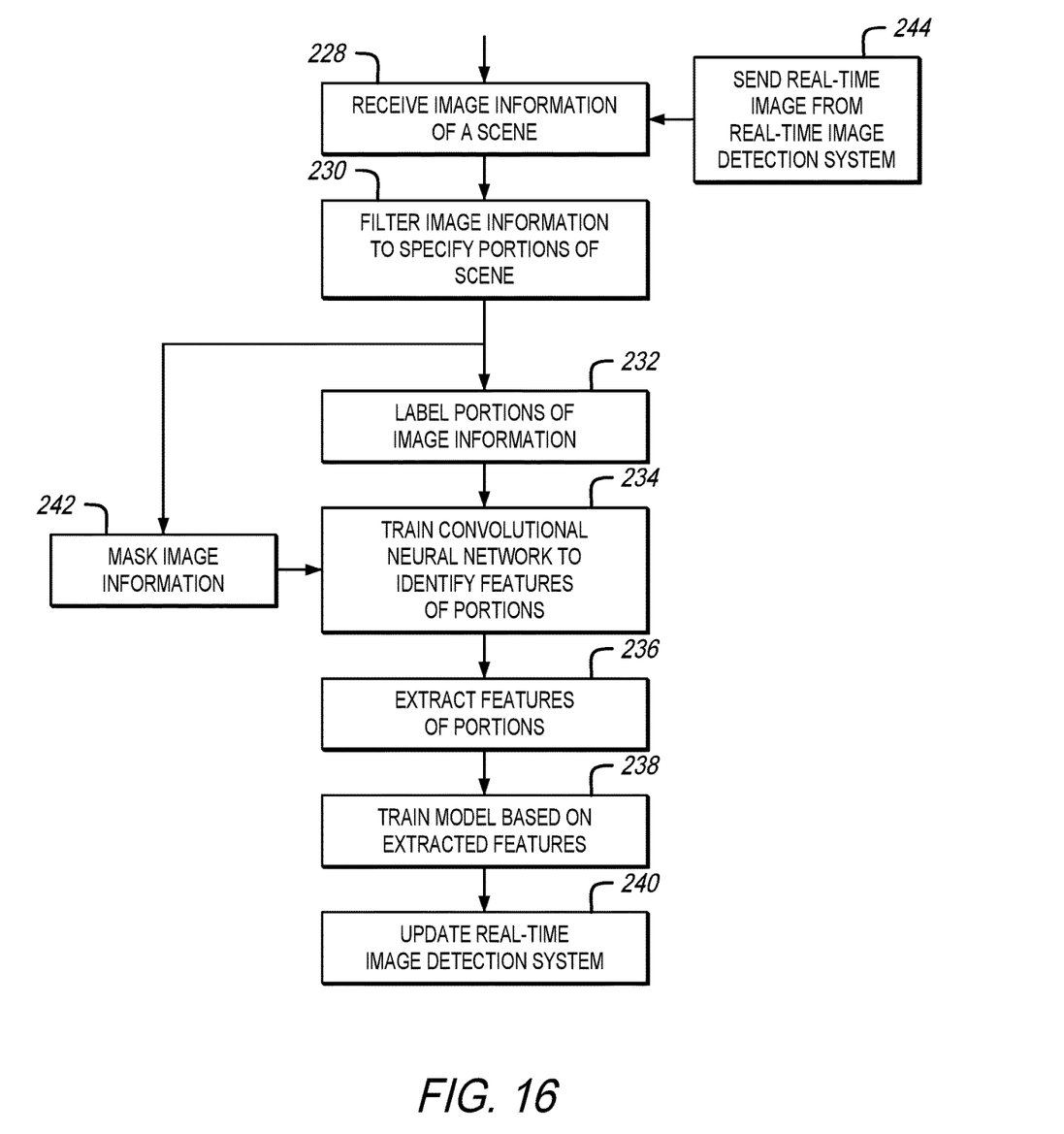
FIG. 16 is a flow diagram of a method of image detection and training in accordance with an embodiment of the present invention.

FIG. 16 is a flow diagram of a method of image detection and training in accordance with an embodiment of the present invention.

At Step 228, the method receives image information of a scene. As described herein, the image information may be stock images or real-time images, as appropriate.

At Step 230, the method filters the image information to specify portions of the scene. As described herein, the filtering step is similar to that of Step 216 in FIG. 15, but may vary to fit the particular training environment.

At Step 232, the method labels the specified portions of the image information. As described herein, the labeling step is similar to that of Step 218 in FIG. 15, but may vary to fit the particular training environment.

At Step 234, the method trains a convolutional neural network to identify features of the labeled portions of the image information. At Step 242, the method may also, in parallel with Step 234, mask the image information to isolate particular portions of the image. Masking is described in more detail herein.

At Step 236, the method extracts features of the labeled portions. These features may correspond to the contours or other image features, as expressed herein.

At Step 238, the method trains a model based on the extracted features. The trained model then reflects updates based on the extracted features.

At Step 240, the method updates the real-time image detection system. As described herein, the real-time image detection system may be implemented on an airplane, brick-and-mortar applications, remote sites, or otherwise, as one of ordinary skill in the art would recognize.

At Step 244, the method sends the real-time image from the real-time image detection system to be received in connection with Step 228. In this fashion, real-time images may be utilized to train the model for future use and more accurate object prediction and detection.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method of inventory management, the method comprising:
    responsive to detecting a transport vehicle and determining at least one object of one or more objects inserted into the transport vehicle, obtaining, by a central processing unit (CPU), a real-time image of a scene including the one or more objects corresponding to aircraft stock using a sensor;
    filtering, by the CPU, the real-time image to delineate portions of the scene;
    predicting, by the CPU, both a location and an initial type of at least one object of the one or more objects corresponding to the aircraft stock in the filtered real-time image by analyzing the filtered real-time image;
    identifying, by the CPU, at least one portion of the at least one object of the initial type predicted; and
    classifying, by the CPU, a final type of the at least one object using a trained model based at least in part on the location, the initial type predicted, and the at least one identified portion.

2. The method of claim 1, further comprising:
    transmitting, by the CPU, the real-time image to a remote site configured to generate updates to the trained model.

3. The method of claim 1, further comprising:
    receiving, by the CPU, over-the-air updates to the trained model from a remote site.

4. The method of claim 1, wherein the at least one object is predicted by using a mask to detect features of the at least one object.

5. The method of claim 1, wherein the at least one portion of the at least one object is a pixel.

6. The method of claim 1, wherein the at least one object is classified as the transport vehicle.

7. The method of claim 1, wherein the at least one object is classified as an item inserted at a location.

8. The method of claim 1, wherein the at least one object is classified as an item removed from a location.

9. The method of claim 1, wherein the at least one object is classified as an aircraft catering item.

10. The method of claim 1, wherein at least one object is classified using the trained model to manage inventory more efficiently and reduce waste and cost through optimized catering loading plans.

11. A stock management system comprising:
    a sensor configured to receive a real-time image of a scene;
    a wireless communication device configured to transmit and receive wireless data;
    a vision recognition system comprising a central processing unit (CPU), the CPU configured to utilize the sensor to, responsive to detecting a transport vehicle and determining at least one object of one or more objects inserted into the transport vehicle, obtain a real-time image of the scene including the one or more objects corresponding to aircraft stock, filter the real-time image to delineate portions of the scene, predict both a location and an initial type of at least one object of the one or more objects corresponding to the aircraft stock in the filtered real-time image by analyzing the filtered real-time image, identify at least one portion of the at least one object of the initial type predicted, and classify a final type of the at least one object using a trained model based at least in part on the location, the initial type predicted, and the at least one identified portion; and
    a remote machine learning system configured to generate updates to the trained model using the wireless communication device.

12. The stock management system of claim 11, wherein the remote machine learning system is configured to receive image information of a scene, filter the image information to specify delineated portions of the scene, label at least one portion of the image information, train a convolutional neural network to identify features of the at least one portion of the image information, extract the features of the at least one portion of the image information, and train a model based on the extracted features to be used in connection with real-time object detection.

13. The stock management system of claim 11, further comprising:
    a security system module configured to provide security for at least one of the wireless data, the real-time image, the at least one object, the at least one portion of the at least one object, and the trained model.

14. The stock management system of claim 13, wherein the security system module is a hardware security module.

15. The stock management system of claim 13, wherein the security system module is a software security module.

* * * * *